United States Patent

White

[15] 3,648,232
[45] Mar. 7, 1972

[54] FLIGHT PATH DISPLAY INSTRUMENT
[72] Inventor: Alvin S. White, Marina Del Rey, Calif.
[73] Assignee: Singer-General Precision, Inc.
[22] Filed: June 9, 1970
[21] Appl. No.: 44,677

[52] U.S. Cl. ................................. 340/27 R, 73/178 R
[51] Int. Cl. ............................................. G08g 5/00
[58] Field of Search ........................... 340/27; 73/178

[56] References Cited

UNITED STATES PATENTS 3,569,926  3/1971  Korn et al. ..................... 340/27 NA
3,230,819  1/1966  Noxon ......................... 340/27 R UX Primary Examiner—Alvin H. Waring
Attorney—Linval B. Castle

[57] ABSTRACT

An electro-optical flight instrument is provided which accepts input signals from appropriate sensors and transducers on an aircraft to provide a visual display of the pitch angle of the aircraft, the visual display being established by means of a transparent screen positioned in the pilot's normal line of sight and focused at infinity. A servo reticle is driven in the instrument and is projected at infinity upon the transparent screen, the servo reticle displaying in degrees, the angle between the aircraft and the horizon.

2 Claims, 4 Drawing Figures

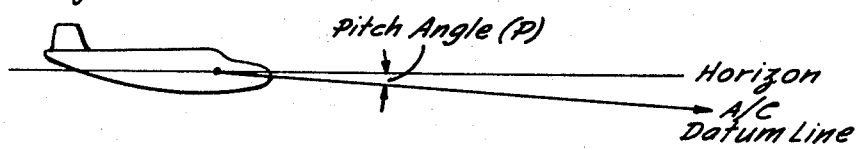
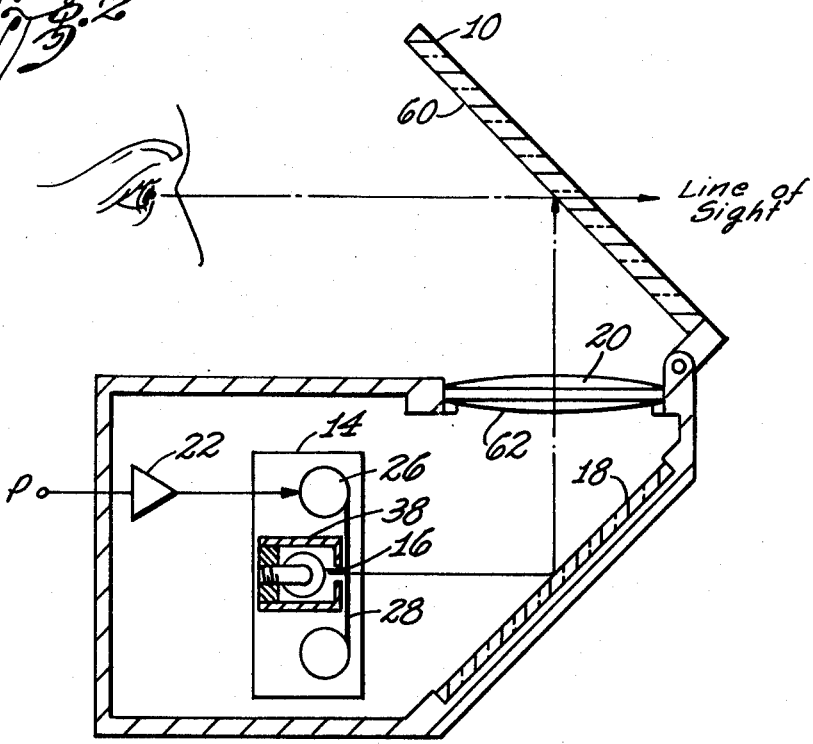

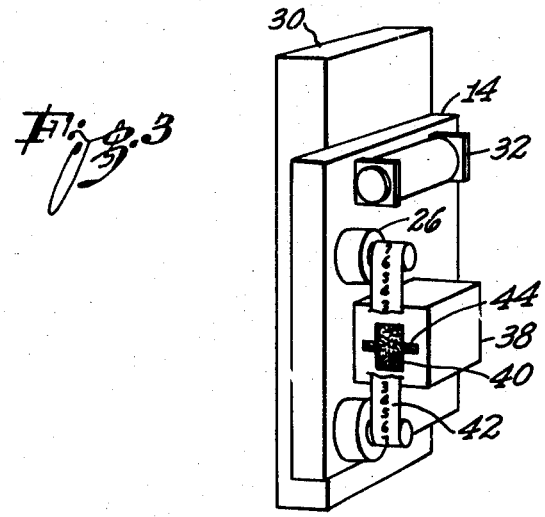
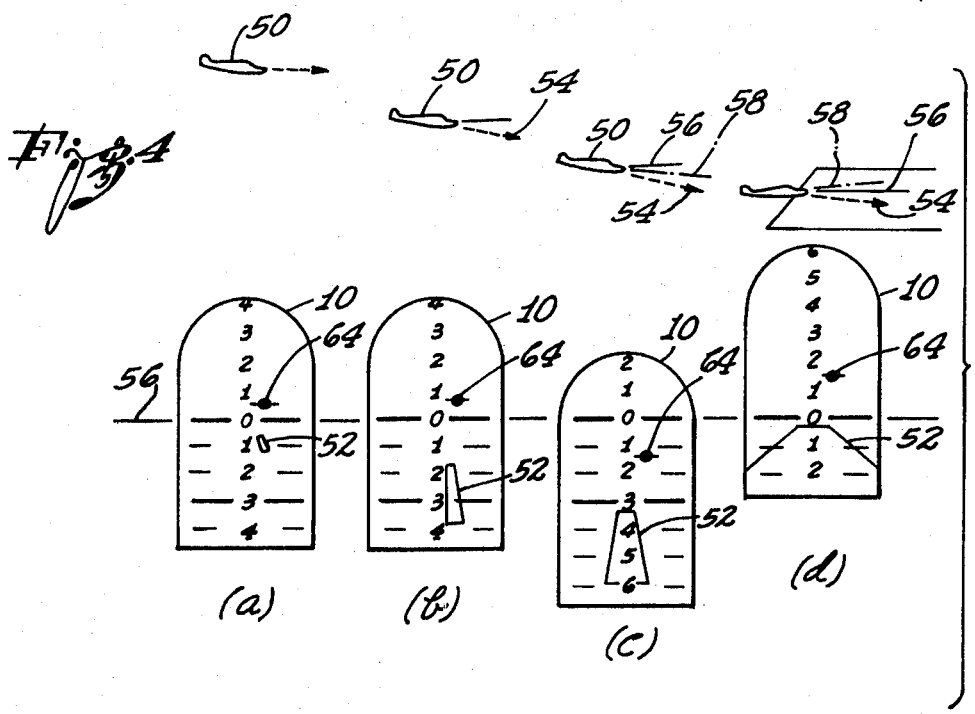

FLIGHT PATH DISPLAY INSTRUMENT

RELATED COPENDING APPLICATIONS

The invention disclosed and claimed herein is an improvement over the system described in copending application Ser. No. 744,397 filed July 10, 1968, now U.S. Pat. No. 3,593,260, entitled "Flight Path Display." The copending application describes a similar type of flight instrument which accepts the angle of attack signal and displays a mark representing the actual flight path of the aircraft through the air mass. The aforesaid is optically projected at infinity onto the transparent screen, and therefore into real world coordinates, so that the projection shows the pilot his actual touchdown point on an airport runway.

The invention disclosed herein is also an improvement over subsequent U.S. Pat. application Ser. No. 778,520, filed Nov. 25, 1968 now U.S. Pat. No. 3,593,259, entitled "Alpha-Gamma Flight Path Display" and application Ser. No. 808,480 filed Mar. 19, 1969, now U.S. Pat. No. 3,569,926, and entitled "Flight Path and Speed Command Display." The systems described in the subsequent two copending applications are generally similar to the system disclosed in the first-mentioned application.

BACKGROUND OF THE INVENTION

There are many types of instruments provided in the prior art for aiding the pilot in making approaches and landing during inclement weather and when an airport is below visual flight rule (VFR) conditions. However, when the weather is clear and when instrument landing facilities are not available, the pilot is usually without any external assistance and must rely on his own judgment in guiding his aircraft down to a proper landing approach. While such a procedure presents no particular problems to pilots of smaller aircraft, it is of some serious concern to crews of larger aircraft which cannot readily be maneuvered during a landing pattern to correct for unintended departures from an intended flight path.

A purpose of the system and instrument of the present invention, as was the case with the systems disclosed in the copending applications, is to assist the pilot in determining an accurate approach for landing his aircraft under visual conditions. This is achieved in the instrument of the present invention by projecting into the pilot's normal line of sight, an illuminated scale showing the pitch angle of the aircraft at any particular time.

The system of the copending application Ser. No. 788,520, now U.S. Pat. No. 3,611,476, provides an accurate means for determining the actual glide slope angle of the aircraft during landing. This is achieved by providing a scale, calibrated in degrees, and projected into the pilot's line of sight upon the transparent screen. In the instrument of the copending application, the scale provides an indication in degrees, regardless of the aircraft altitude, of the angle between the horizon and any objects selected by the pilot through the transparent screen. Such a selected object would normally be the touchdown point, as viewed through the transparent screen. Thus, by use of the system described in the copending application, the pilot may easily set up a desired glide slope angle by merely positioning his aircraft so that the selected glide slope angle, as viewed through the transparent screen, coincides with the touchdown point on the aircraft runway. To land at that touchdown point, the pilot makes the necessary speed and altitude corrections so that the angle of attack marker that is projected onto the transparent screen will continue to coincide with the desired touchdown point on the runway.

By the instrument and system of the present invention, a somewhat simpler landing procedure is provided, in that the calibrated scale projected into the pilot's line of sight upon the transparent screen indicates the actual pitch angle of the aircraft, rather than the flight path as in the preceding application. When the instruments and systems described in the copending applications are utilized, the flight path indicated thereby is dependent upon the movement of air mass, that is, upon the headwind or tailwind. However, when the system of the present invention is used, the pilot can establish any desired pitch angle by holding a calibration corresponding to that angle, for example, on the desired touchdown point. Then, the angle will be maintained regardless of movement of air mass.

SUMMARY OF THE INVENTION

The invention comprises an optical display instrument which receives signals representing pitch angle of an aircraft from the aircraft sensors. These signals drive a servo which position a back-lighted reticle located in the principal focal plane of an optical system so that reticle images are projected upon a transparent screen positioned in the pilot's line of sight. These images are focused at infinity, so that the pilot, without eye refocusing, observes the reticle images as if they were projected upon the terrain or sky background.

BRIEF DESCRIPTION OF THE DRAWINGS

FIG. 1 is a diagram showing an aircraft pitch angle;

FIG. 2 is a schematic diagram of the pitch angle display instrument constructed in accordance with the concepts of the invention;

FIG. 3 is an illustration showing, in perspective, a reticle servoing system which may be used in the instrument of the invention; and FIG. 4 is an illustration showing how the pitch angle may be presented to the pilot during four stages of an approach to a landing.

DETAILED DESCRIPTION OF THE ILLUSTRATED EMBODIMENT

FIG. 1, which is presented to assist in an understanding of the invention, shows an aircraft during descent. The aircraft centerline, designated on the drawing as the datum line, and indicated by the symbol 64 in FIG. 4, shows that the aircraft is pitched below the horizon by an angle P. This angle is identical with that displayed by the artificial horizon instrument on the pilot's instrument panel.

FIG. 2 is a simplified schematic diagram of the pitch angle display instrument of the invention. The instrument accepts input angles representing the pitch angle P, and projects reticle images into the pilot's line of sight representing the pitch angle. The display instrument shown in FIG. 2 comprises a transparent screen or a combining glass 10 which is coated with a thin optical coating to accept a projected image of light from a display instrument.

As shown in the drawing, combining glass 10 is made of a plurality of individual sections, each of which is silvered upon only those surfaces in physical contact with adjacent sections. The purpose of sectioning the combining glass 10 is to provide a "venetian blind" effect that will readily permit horizontal viewing through the combining glass, but which will be opaque at vertical angles. This prevents sunlight from entering into the optical system. A further advantage of the sectioned combining glass is to prevent the images of the reticles from being projected on the aircraft windshield, an effect which might cause confusion to the pilot.

The combining glass 10 receives the projected images of the reticle which eminate from a reticle carrier 14 within the flight instrument. The reticles carried by the reticle carrier 14 are projected, by a projection lens 16 positioned behind the reticles, against a 45° mirror 18 and through a collimating lens 20 to the surface of the combining glass 10. As previously mentioned, the reticles contained in the flight path display are driven by signals representing the pitch angle P. The pitch angle signal is amplified in an amplifier 22. The lamp 16 is contained in a lamp housing 38 which is firmly affixed to the reticle carrier 14.

An opaque tape 28 is driven by a servomotor 26, and the tape has transparent numerals 42 thereon, so that when the tape is passed before the rectangular portion of a reticle 40 (FIG. 3) in the lamp housing 38 in front of the lamp 16, only the transparent numerals will project through the optical system to the combining glass 10. The symbol 64 is fixed relative to the frame of the aircraft, and may be projected through a portion 44 of the reticle 40.

Reference bars are also provided on the tape opposite the degree indications of 0 to −10, with the reference bars for 0° and −3° being accentuated, as shown in FIG. 4. These reference bars are useful in maintaining a desired numeral calibration in coincidence with a desired point of contact on a runway, for example, during a crab-angle landing in the presence of crosswinds, and when the numeral itself is displaced from the runway. The reference bars are also convenient during flight for quickly determining the relative altitude of adjacent aircraft.

FIG. 4 illustrates the operation of the instrument of the invention as it displays to the pilot various information during an approach to a landing. In FIG. 4a, the aircraft 50 is at cruising speed and is in a normal horizontal cruising attitude. The aircraft datum line, as indicated by the symbol 64, and the zero reading on the pitch angle scale, now both coincide with the horizon line 56. Therefore, the pitch angle is equal to zero, and the nose of the aircraft is essentially on the horizon. The display of FIG. 4a shows an airport runway 52 in the distance as slightly below the horizon.

In FIG. 4b the pilot, decided to land on the airport runway 52, has reduced power and is permitting the aircraft to slow down by maintaining a horizontal attitude. Thus, the aircraft datum line remains substantially horizontal, as indicated by the position of the symbol 64, and the aircraft pitch angle is essentially zero, but the aircraft is starting to settle along a flight path as indicated by the arrow 54. The aircraft runway 52, which now appears closer through the combining glass 10, is viewed by the pilot with a particular calibration on the pitch angle scale aligned with a desired touchdown point on the runway 52.

In FIG. 4c the aircraft 50 has lowered its nose below the horizon 56 and the aircraft datum line 58, as indicated by the symbol 64 now makes a small pitch angle with the horizon 56, as designated by the scale on the display. This pitch angle P is sensed by the aircraft sensors and relayed through the amplifier 22 to the servomotor 26, which drives the tape 42 to a position dictated by the signals from the aircraft sensors.

By now, the aircraft has steepened its descent and the flight path shown by the arrow 54 has become larger. As viewed by the pilot through the combining glass, the reticle on tape 42 has moved upward so that the zero mark of the reticle remains on the horizon. The entire combining glass is shown to be lowered, indicating that the aircraft nose has lowered. The aircraft has been aligned with the runway 52 and the pilot has adjusted his descent so that the desired numeral calibration on the display is aligned with his desired touchdown point upon the runway 52. All that the pilot need do now is to hold that calibration in coincidence with the selected touchdown point and he will come in at that angle, regardless of movement of the air mass. Should he decide at any point in the descent to change his approach to a less steep angle, all he need do is to control the aircraft until a new numeral calibration (corresponding to the new number) is set on the touchdown point.

FIG. 4d illustrates the situation which arises after the aircraft has crossed the airport boundaries and is flared and ready for touchdown upon the runway 52. At this point, the aircraft nose is high, as shown by the symbol 64, and the aircraft datum line is shown producing a nose-up pitch. The nose-high attitude of the plane is illustrated in FIG. 4d by the higher position of the combining glass 10. The pitch angle sensors of the aircraft adjust the reticle of the tape 42 so that the zero mark still coincides with the horizon. At this point in the approach, it may be advisable for the pilot to raise the nose of the aircraft even further so that the selected calibration on the scale approaches the zero line slope angle at the instant of touchdown in order to provide a smooth landing without danger of bounce.

It will be appreciated that because the reticle images are projected onto the combining glass 10 at a focus of infinity, the pilot can easily observe these reticle images without the need of refocusing his eyes and without the need of removing his eyes from his intended flight path or point of touchdown on the runway. Furthermore, because the reticle images are projected at infinity upon the surface of the combining glass 10, these projected images will not change with respect to the observed background as the pilot's line of sight changes. Thus, as the pilot moves his head and his line of sight across the surface of the combining glass 10, the projected reticle images will appear stationary upon the background.

The combining glass 10 may be constructed of a single transparent glass plate which has been coated with a narrow band optical notch filter 60 (FIG. 2) which passes all wavelengths except the very narrow optical band, preferably at a wavelength of approximately 6,200 A. Collimating lens 20 may then be coated with a narrow band optical filter 62 which passes only that light which corresponds in wavelength with that rejected by filter 60. The reticle images are then projected upon the combining glass 10 with a particular color which will not pass through the combining glass 10 and which accordingly must be reflected towards the pilot. The advantages of using the resulting optical interference filters 60 and 62 are that a lower intensity lamp 16 may be used to project the reticle images, than would be otherwise required, and also the external sunlight attempting to enter the system from a vertical angle above the combining glass 10 is completely reflected or absorbed before it can be focused by the collimating lens 20 upon the reticles which are positioned in its focal plane.

The invention provides the pilot with all the necessary information required by him to make an approach at a proper glide slope angle towards a definite touchdown point on the runway, regardless of tailwinds or headwinds, and aids the pilot in making a perfect and soft touchdown without danger of bouncing the aircraft. The symbol 64 has an additional feature in that it permits the pilot to set his aircraft at the desired rotation angle during takeoff without having to take his eyes off his course to look at panel instruments.

It is evident that although a particular embodiment of the invention has been shown and described, modifications may be made, and it is intended to cover in the appended claims all such modifications which fall within the spirit and scope of the invention.

What is claimed is:

1. An aircraft display instrument for displaying aircraft pitch angle to the pilot, said instrument comprising: a movable reticle comprising a scale calibrated in degrees of pitch angle; servo means responsive solely to output signals from a pitch angle attack sensor for moving said reticle; and optical means for projecting at infinity an image of said reticle upon a transparent surface in the pilot's line of sight, whereby the reticle images are projected upon the apparent terrain position of touchdown of the aircraft.

2. The instrument claimed in claim 1, wherein said reticle comprises an opaque tape having transparent numerals.

* * * * *